Patented Apr. 6, 1954

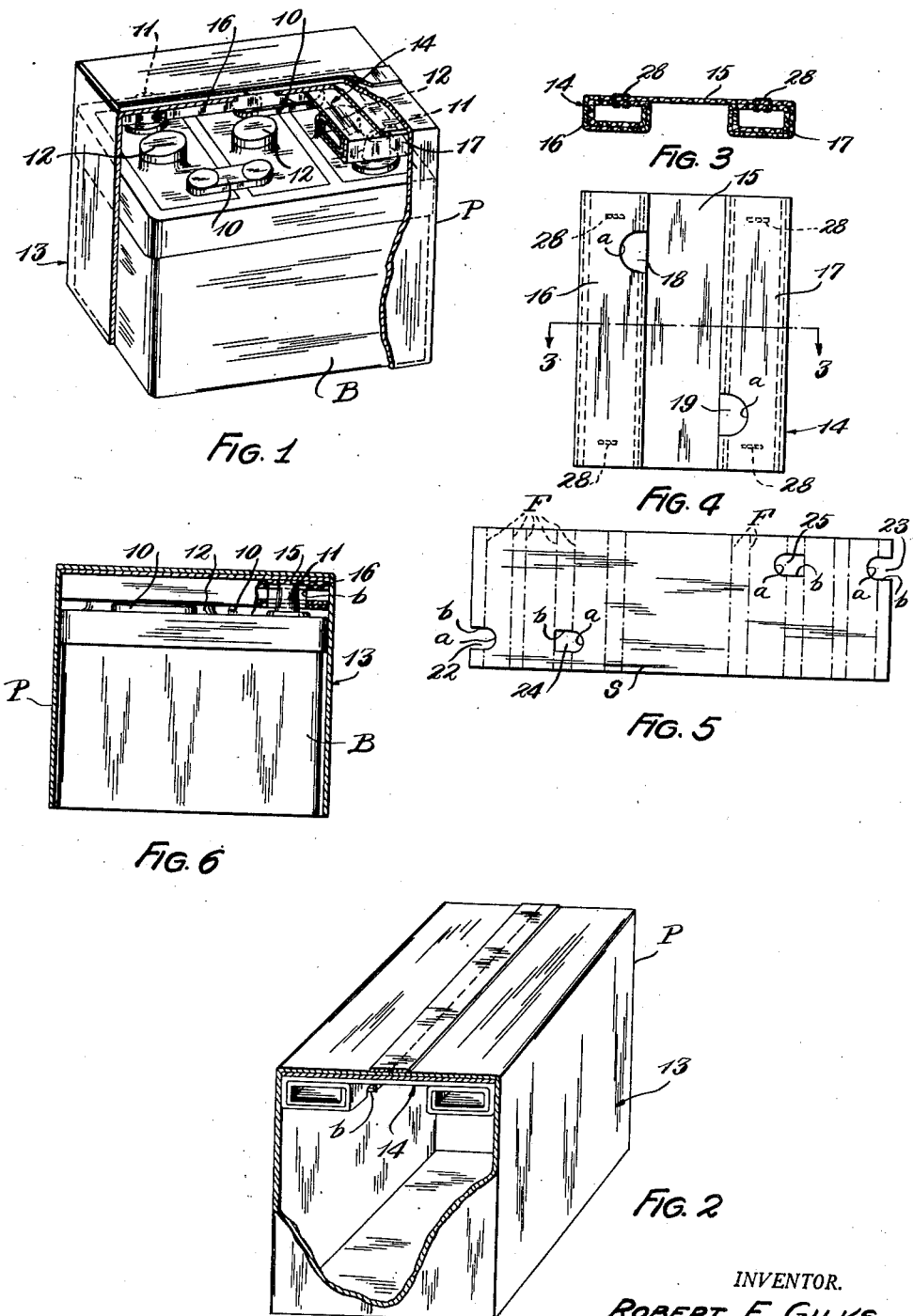

2,674,369

UNITED STATES PATENT OFFICE 2,674,369

BATTERY CARTON

Robert E. Gilks, Euclid, Ohio, assignor to Willard Storage Battery Company, Cleveland, Ohio, a corporation of West Virginia Application August 11, 1949, Serial No. 109,725

5 Claims. (Cl. 206—46)

The present invention relates to new and improved cartons for packaging storage batteries and particularly storage batteries of the lead acid type.

The principal object of the present invention is the provision of a new and improved storage battery package including a relatively inexpensive carton so constructed and arranged as to enable lead-acid type storage batteries, which are relatively heavy, to be packed therein and stacked one on top of another without the use of other load bearing devices and without injury to the battery filler caps, etc.

Another object of the invention is the provision of a new and improved storage battery package including a battery enclosed in a carton having a top structure comprising a sheet of relatively stiff material, such as corrugated fiberboard or paperboard, substantially covering the top of the battery and two tubular supporting members on the underside of the sheet, the lower sides of which rest upon the top of the battery and support the sheet above the filler caps and the tops of the terminal posts of the battery, whereby batteries so packaged may be stacked one on top of another without the use of other load-bearing devices and without injury to the tops of the batteries.

A further object of the invention is the provision of a new and improved storage battery package including a carton enclosing the sides of the battery and having a top wall structure comprising a pair of tubular load-supporting or bearing members substantially rectangular in cross-section the lower sides of which engage the top of the battery and the upper sides of which project above the filler caps whereby a load such as additional batteries may be supported on the package without damage to the battery.

The invention resides in certain constructions and combinations and arrangements of parts and further objects and advantages will be apparent to those skilled in the art to which it relates from the following description of the preferred embodiment described with reference to the accompanying drawings forming a part of this specification, in which:

Fig. 1 is a perspective view, having portions broken away, of a typical lead-acid storage battery for use in passenger automobiles enclosed in a carton embodying the present invention;

Fig. 2 is a perspective view, having portions of the carton shown in Fig. 1, broken away;

Fig. 3 is a sectional view approximately on the line 3—3 of Fig. 4 of the load supporting member of the carton shown in Figs. 1 and 2;

Fig. 4 is a plan view of the member shown in Fig. 3;

Fig. 5 is a plan view of a strip of sheet material prior to folding into a load supporting member such as shown in Figs. 3 and 4; and Fig. 6 is a side view, partly in section, and partly broken away, of the carton enclosing a storage battery.

In general, the invention contemplates a carton for storage batteries, which carton is formed of relatively inexpensive sheet material, such as fiberboard or paperboard, and which is adapted to be placed over a battery and affords such protection to the terminal posts, filler caps, cell connectors and the sealing compound for the cell covers that the batteries may be safely stacked one on another for storage or shipment. The carton preferably comprises an open bottom boxlike collar having a battery top protector or load supporting member incorporated in the top thereof, which battery top protector is also formed of sheet material preferably folded to form a pair of tubes, the lower sides of which are adapted to rest on the cell connector or connectors of the battery and the opposite sides of which form a support surface above the tops of the terminal posts and filler caps of the battery. In the preferred form of the invention, the battery top protector is adapted to substantially cover the top surface of the battery and the tubular support members have openings therein for the reception of the terminal posts when the tubular members rest on the cell connectors.

The present carton is particularly useful for the storage and shipment of lead-acid type storage batteries for automobiles, one of which is shown at B, and which batteries include cell connectors 10, terminal posts 11 and filler caps 12. The filler caps 12 are used to close the usual water replenishing openings at the top of each of the cells. The cell connectors and terminal posts are attached to the battery plates and the construction is such that the cell connectors and terminal posts can support a considerable load without injury to the battery. The top surface proper of the battery, on the other hand, cannot support an appreciable load without damage thereto. The sealing compound which forms a part of the battery top is also easily marred. It is the purpose of the present invention to provide a carton of such construction that any weight, within limits, placed on the top of the battery is borne by the cell connectors and terminal posts, and the remainder of the battery protected against contact with objects which might otherwise damage or mar the same. If desired, the terminal posts may be shielded by the carton and the entire load borne by the cell connectors.

Referring to the drawing, the carton P shown is designed for batteries of the type illustrated having the cell connectors located on opposite sides of the battery and in non-aligned relationship. The carton P includes a rectangular, open bottom fiberboard collar 13 which is closed at the top and which has a battery top protector or load supporting member 14 in the top battery thereof. The protector 14 is in the form of an insert and comprises a rectangular panel 15 adapted to substantially cover the top of the battery and two parallel tubular supporting members 16, 17 on the underside thereof, which members extend along two opposite edges of the panel. The tubular members 16, 17 have openings 18, 19 formed in their lower sides for the reception of the terminal posts of the battery when the lower sides of the members engage the cell connectors of a battery, see Fig. 3. Preferably, the openings are somewhat larger than the diameters of the terminal posts so that the same protector 14 can be used with batteries having variations in spacing between the terminals, thus reducing the number of sizes of protectors to be inventoried. The depth of the tubular members 16, 17 is preferably such that when their lower walls engage the cell connectors with the ends of the terminal posts extending through the openings provided therein, the upper ends of the terminal posts engage the undersides of the upper walls of the members 16, 17 and assist in supporting the panel 15 and in turn, any load placed on the package.

Where shipping requirements are such that the terminal posts must be spaced from the carton top, the depth of the tubular members may be increased so that the tops of the terminal posts are spaced approximately one-half inch or so from the upper insides of the members 16, 17. In this case any load placed on the package is borne solely by the cell connectors. When the carton P is in place on a battery, as described, the panel 15 of the top protector is supported over the filler caps, terminal posts and sealing compound and protects these members against injury or marring. The top protector 14 may be placed on the battery before the collar 13 is slipped over the battery or it may be inserted in the collar 13 and positioned on the battery when the collar is placed over the battery. Preferably, the top protector 14 fits rather snugly in the top of the collar 13 so that for practical purposes it forms a part of the collar.

Preferably, the carton P, including the battery top protector 14, is formed of a relatively inexpensive sheet material, such as fiberboard or paperboard, which can be disposed of when the battery with which it is employed is placed in use. In the preferred embodiment of the invention, the battery top protector 14 is formed of a single sheet S of sixteen point, two hundred pound test, double faced corrugated fiberboard, see Fig. 5, although the thickness may vary according to the use to be made of the packages. The sheet is folded in such manner that the tubular members 16, 17 consist of folds of the sheet which are in the form of loops or coils. Preferably, each wall of the members 16, 17 comprises two folds or thicknesses of the sheet, although one fold could be used where the protector is to be subjected to relatively light loads. The terminal post receiving openings 18, 19 are preferably formed by cutting openings in the sheet S, as by punching, prior to the formation of the tubular support members 16, 17.

In the embodiment of the invention shown, generally keyhole shape recesses 22, 23 having semicircular ends $a$ and rectangular sections $b$, are formed at opposite end edges of the sheet S and holes 24, 25 of like shape are formed inwardly of the end edges and in lateral alignment with the respective recesses 22, 23. The holes 24, 25 are positioned so that they will fall in registration with the respective recesses 22, 23 when the sheet is folded to form the tubular support members 16, 17. The form of the recesses 22, 23 and openings 24, 25 is such that when the sheet S is folded to form the tubular support members 16, 17, the semicircular portions $a$ of the recesses and openings are in the bottom wall of the support members and the rectangular sections $b$ of the recesses and openings are in the inner side walls of the support members. By this construction, a terminal post extending into the support members has protective wall sections on opposite sides thereof as seen in Fig. 4. The sheet S is preferably broken along fold lines indicated at F, which lines are so spaced that the folds forming the walls of the support members 16, 17 lie against one another. The folded portions of the sheet are stapled to the panel 15 as seen at 28, to secure the sheet in its folded form.

When formed in the manner described, the battery top protector 14 can withstand a 500 lb. load or more, which enables stacking of lead-acid type batteries, such as those used in passenger automobiles, as high as five or more deep without injury thereto or without the use of additional load supporting devices. The tubular form of the support members 16, 17 provides a resilient support over the filler caps, which are between the cell connectors. The top protector also absorbs shocks generally, and prevents marring of the top of the battery thus enabling the battery package to support a considerable load.

It is to be understood that the carton P, including the battery top protector may differ in form according to the particular type of battery with which it is to be used. For example, if the battery has its cells extending longitudinally and in end-to-end relation to form a relatively long, narrow battery, the top protector may comprise a correspondingly narrow top panel having two tubular members on its underside and extending side by side longitudinally of the panel. The tubular members may have openings in the bottom sides to receive the terminal posts and filler caps of the battery. As in the first described form, the tubular support members of the top protector will rest on the cell connectors and provide a resilient, load bearing structure capable of supporting a considerable load above and out of contact with filler caps, etc., of the batteries.

Preferably, the top surface of the battery top protector 14 corresponds closely to the inside of the top wall of the collar 13 so that the top wall is substantially entirely supported by the protector. The sides of the protector 14 also preferably frictionally engage the insides of the collar to hold the protector in the collar.

It will be seen that by the present invention, a battery carton is provided which may be readily manufactured with a minimum of inexpensive material and which will support a considerable load so that batteries may be stacked without the use of pallets or other forms of supporting devices. The cost incident to the storage and shipment of batteries is thus substantially reduced over known practices and the handling and maintenance of special tiering pallets or trays may be eliminated.

While the preferred form of the invention has been described in considerable detail, it will be apparent that the invention is not limited to the constructions shown and it is my intention to cover hereby all adaptations, modifications and changes therein which come within the practice of those skilled in the art to which the invention relates and the scope of the appended claims.

Having thus described my invention, I claim:

1. A storage battery having two cell connectors projecting from the top adjacent opposite sides thereof and two terminal posts projecting from the top and adjacent the adjacent sides, in combination with a carton for said battery comprising a collar closed at the top and open at the bottom and having the sides thereof enclosing the sides of said battery, and a fiberboard sheet having a central panel extending substantially over the top of said battery and having the portions at opposite sides thereof folded to form two parallel tubular sections rectangular in cross section and resting on the respective cell connectors, said tubular sections each having an opening in a wall thereof and receiving the respective terminal posts, said tubular sections forming support elements between the battery connectors and the top of the collar.

2. A storage battery having two cell connectors projecting from the top adjacent opposite sides thereof and two terminal posts projecting from the top and adjacent the adjacent sides, in combination with a carton for said battery comprising a collar closed at the top and open at the bottom and having the sides thereof enclosing the sides of said battery, and a fiberboard sheet having a central panel extending substantially over the top of said battery and having the portions on opposite sides thereof folded to form two parallel tubular sections rectangular in cross section and having the walls thereof comprising two thicknesses of said fiber sheet, said tubular sections resting on the respective cell connectors and each having an opening in a wall thereof for the reception of the respective terminal posts, said sections forming support elements between the battery connectors and the top of the collar.

3. The combination of a multiple cell lead-acid type storage battery comprising a box-like enclosure, terminal posts projecting through and extending above the top of said enclosure, an open bottom box-like member enclosing the top and sides of said battery, an inverted U-shaped terminal post protector and load bearing member interposed between the top of said box-like enclosure and the underside of the top of said open bottom box-like member, said terminal post protector and load bearing member having a central panel overlying the top of said battery and parallel tubular side portions of rectangular cross-section having lower or bottom panels in engagement with said battery and spacing the top of said open bottom box-like member above said terminal posts, said terminal post protector and load bearing member having openings for the reception of said terminal posts of said battery.

4. The combination of a multiple cell lead-acid type storage battery comprising a box-like enclosure, terminal posts projecting through and extending above the top of said enclosure, connector posts projecting through and extending above the top of said enclosure, cell connectors located above the top of said enclosure and connected to said connector posts, a corrugated cardboard bottomless box-like carton enclosing the top and sides of said battery, an inverted U-shaped corrugated cardboard terminal post protector and load bearing member interposed between the top of said box-like enclosure and the underside of the top of said carton, said terminal post protector and load bearing member having a central panel overlying the top of said battery and portions at opposite sides folded to form parallel tubular sections of rectangular cross-section having lower or bottom panels in engagement with said connector straps and spacing the top of said carton above said battery, said terminal post protector member having openings for the reception of said terminal posts of said battery.

5. The combination of a multiple cell lead-acid type storage battery comprising a rectangular case, cover means closing the top of said case, terminal posts projecting through and extending above said closure means, connector posts projecting through and extending above said closure means, cell connectors located above said closure means and connected to said connector posts, a bottomless corrugated cardboard box-like carton enclosing the top and sides of said battery with the sides of said carton engaging the sides of the battery, an inverted U-shaped corrugated cardboard terminal post protector and load carrying member interposed between said cover means and the underside of the top panel of said carton, said member being of inverted U-shape and having a central panel overlying said closure means and in engagement with the underside of the top panel of said carton portions at opposite sides folded to form parallel tubular sections of rectangular cross-section having upper or top panels in engagement with the underside of said central panel and opposite lower or bottom panels in engagement with said connector straps and spacing said central panel and the top panel of said carton above said battery, said member having openings for the reception of said terminal posts of said battery.

References Cited in the file of this patent

UNITED STATES PATENTS

| Number | Name | Date |
|---|---|---|
| 1,585,684 | Oppenheim | May 25, 1926 |
| 1,624,360 | Oppenheim | Apr. 12, 1927 |
| 1,837,012 | Boeye | Dec. 15, 1931 |
| 2,192,992 | Bohnke | Mar. 12, 1940 |
| 2,479,453 | Amatel | Aug. 16, 1949 |